Patented Feb. 20, 1923.

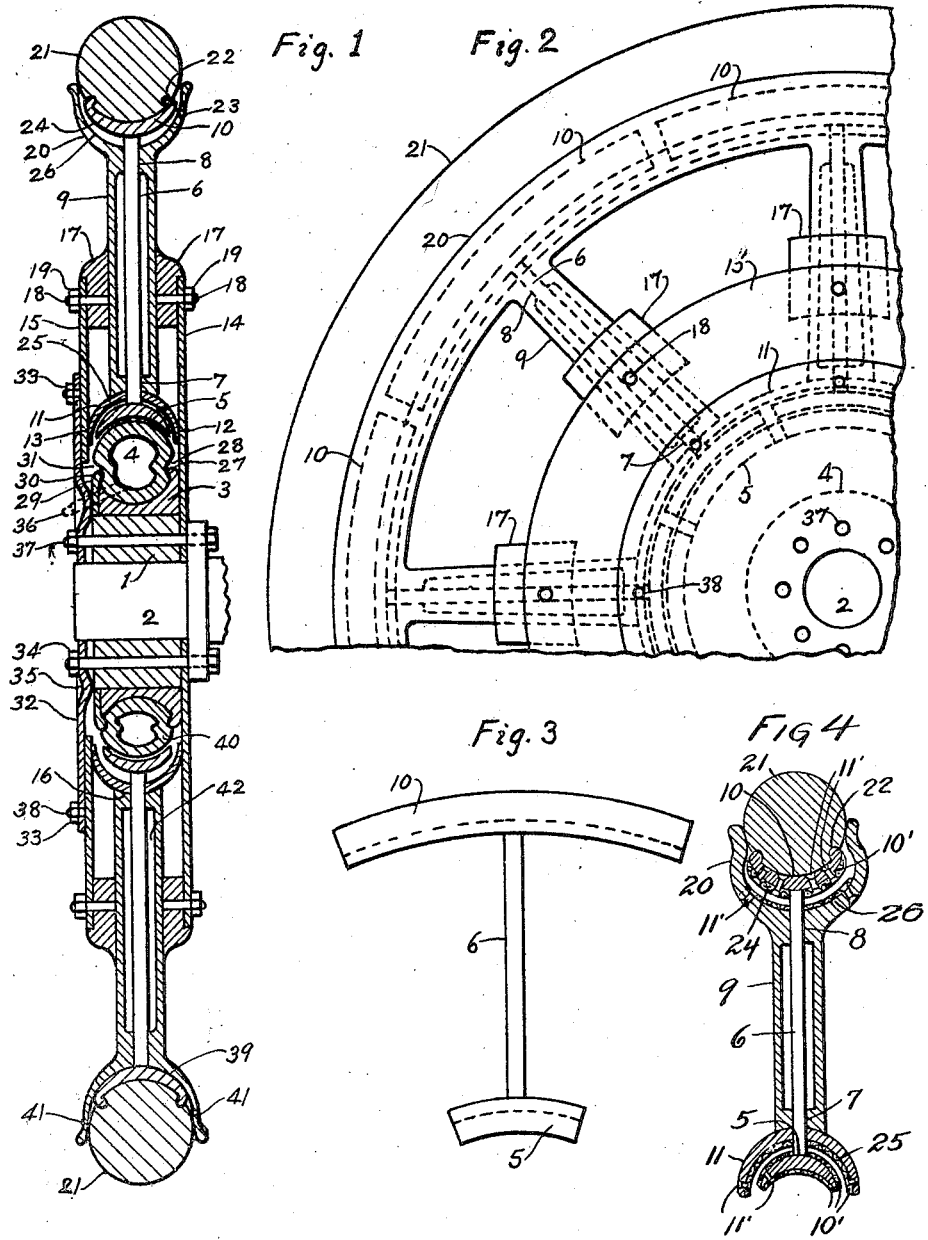

1,446,197

UNITED STATES PATENT OFFICE.

JOHN MARTIN, OF KNOCKLONG, IRELAND.

PNEUMATIC WHEEL.

Application filed September 28, 1920. Serial No. 413,377.

*To all whom it may concern:*

Be it known that I, JOHN MARTIN, a subject of the King of Great Britain, residing at Herbertstown Co-operative Agricultural and Dairy Society, Ltd., Knocklong, Co. Limerick, Ireland, have invented certain new and useful Improvements in Pneumatic Wheels, of which the following is a specification.

This invention refers to improvements in and relating to pneumatic wheels of the kind in which a pneumatic cushion is interposed in a position remote from the solid tire of the wheel and surrounds the hub thereof and is designed to impart a resilient effect to an outer solid tire while preventing puncture of said interposed air cushion from usual objects to be encountered on the road, such as nails or the like. And my invention is also of the kind wherein the inner pneumatic tube or cushion supports on its periphery a series of spaced shoes connected to spokes slidably passing through bearings in a spider wheel or spider member.

According to my invention, the pneumatic wheel consists of a pneumatic tire which encircles the wheel hub in a position remote from the outer tire of the wheel and which pneumatic tire supports inner spoke shoes each of which is connected to an independent spoke which is slidably fitted in bearings attached to a spider wheel, each independent spoke having on its outer end an outer tire shoe which latter in turn are connected to a solid tire which with its corresponding shoes is movably fitted in an outer rim connected to the spider wheel; and said pneumatic tire is semi-enclosed by side retaining plates which latter in turn are connected to the hub proper of the wheel and to the spokes of the spider wheel to take the drive of the wheel, the construction, arrangement and operation of this pneumatic road wheel being such that the weight on the wheel is transmitted through the independent slidable spokes onto the periphery of the inner pneumatic tire and so provides a resilient effect on the outer solid tire and prevents puncturing of the pneumatic tire owing to its isolation from the road surface.

My said invention is more fully described hereinafter with reference to the accompanying explanatory diagrammatic drawing in which the same reference numbers are used to indicate the same parts throughout.

In the drawing Fig. 1 shows a vertical median section through Fig. 2 of the pneumatic road wheel, and Fig. 2 shows in part a front elevation of the pneumatic road wheel. Fig. 3 shows a front or side elevation of one of the independent slidable spokes with its accompanying inner shoe and outer shoe. Fig. 4 shows a sectional view of some of the parts of the pneumatic wheel as hereinafter referred to in the specification.

Said pneumatic wheel consists of a spool hub or hub line-carrier 1 mounted on the wheel hub 2 which latter may be of any suitable pattern. On the spool hub 1 is a detachable rim 3 which carries a heavy and strongly constructed pneumatic tire 4, on which pneumatic tire are saddled at intervals a number of independent inner spoke shoes 5 having the spokes 6 thereof passing as a loose fit or with sufficient clearance through bearings 7 and 8 which bearings are attached to a spider wheel 9, the spokes being in turn connected to outer tire shoes 10. Over the spoke inner shoes 5 there is a bridge rim or ring 11 connected at 12 and 13 by riveting or in any other suitable manner to side retaining plates 14 and 15 respectively, the bridge rim 11 being suitably connected to the spoke bearings 7 at 16 by riveting or welding or making in one piece with the spider wheel 9. The bridge rim 11 encloses the inner shoes 5 and the pneumatic tire and is connected to the spool hub 1 and to the hub proper 2 by means of the inner retaining plate 14. At the outer circumference of the retaining side plates 14 and 15, there are torc transmitting blocks 17 at each side connected to the spider wheel 9 by means of studs 18 secured in each side of the spider wheel 9, and by means of nuts 19, or the blocks 17 might be riveted in position or made in one piece with the spider wheel 9. On the spider wheel 9 there is an outer rim 20 in which are movably fitted the outer spoke shoes 10 and the solid tire 21 which latter may be made out of any suitable and known kind of material such as steel. The outer tire shoes 10 are provided with clinched or inturned edges 22 and with a solid tire such as 21 which has corresponding side indents 23 into which the inturned edges 22 are adapted to be sprung under pressure. With reference to Fig. 4, the spoke shoes 10 at 24 and the bridge rim 11 at 25 and the outer rim 20 at 26 may be lined with soft packing material such as chamois leather or ordinary leather or other suitable material 10' which may be secured in position in a known manner by rivets 11' having their heads countersunk below the surface of the packing material so that in this case if in oscillating the shoes 10 and 5 make contact with the rim 20 and the bridge rim 11 respectively, undue noise will be prevented. The inner tire shoes 5 may also be lined on their insides and outsides with similar packing material 10' in a similar manner for the same purpose. The detachable rim 3 is clinched at 27 into a corresponding circular groove 28 formed in the side of the pneumatic tire 4, and the rim 3 at its other side is provided with a detachable side retaining plate 29 which at 30 is similarly clinched into a corresponding circular groove 31 in the pneumatic tire. The retaining plate 29 may be detachably fixed to the rim 3 by means of counter-sunk screws; and enough clearance is left between the clinched member 30 and the inner diameter of the side plate 15 to allow of the pneumatic tire 4 being withdrawn from position in its deflated condition when the extra or outer side retaining plate 32 is detached from the side plate 15 and from the hub 2 by undoing the nuts 33 and the nuts 34. The outer side plate 32 is provided with a circular depression or groove 35 which serves the two-fold purpose of receiving the tire valve connection 36, shown in dotted lines, and of pressing against and holding in position the retaining plate 29, the rim 3 and the spool 1. The pneumatic wheel is secured to the hub proper by means of the usual detachable bolts 37 which pass through the inner side plate 14, the spool 1 and the outer plate 32 which latter is secured by studs 38 and nuts 33 to the side plate 15, thus transmitting the drive to the torc blocks 17 and to the spider wheel 9 which latter in turn carries the spokes 6 and outer tire 21. The valve connection 36 may be of any suitable and known kind and may be connected in any suitable and known manner for the purpose of inflating the pneumatic tire 4. With reference to Fig. 1, the bottom portions of the wheel at 39 and 41 are shown depressed as under an overload, but under normal conditions the shoes 10 should not make contact with the inside of the bottom portion of the outer rim 20. The load is supported on the pneumatic tire 4, on the shoes 5, on the spokes 6, on the shoes 10 and on the outer tire 21. The outer rim at 41 is made a close fit to the tire 21 to prevent entrance of road matter. The spaces 42 surrounding the spokes 6, may be packed with oil retaining wicks or cotton capable of being oiled through suitable oil holes in the spider wheel 9 for the purpose of lubricating the spokes 6 and their bearings 7 and 8.

I do not broadly claim all improvements in pneumatic or resilient wheels of the kind described herein but I only claim the improved pneumatic wheel constructed substantially as described herein.

To facilitate assembling of the pneumatic wheel parts, the spider wheel 9 and the bridge rim or ring 11 may be manufactured in two separate halves in the known manner and may be bolted or riveted together in the known manner when the spokes 6 are in the bearings 7 and 8 which are previously formed in said halves by boring or drilling according to usual practice. These securing bolts or rivets, not shown in drawing, might be suitably spaced round said spider wheel in a known manner. The opening 42 may be formed in the known manner by coring out in the process of casting the spider wheel 9.

Having described my invention, I claim:—

1. A pneumatic road wheel of the kind described herein comprising in combination with the road wheel hub, a spool hub, a rim surrounding said spool hub and on said rim a pneumatic tire, on the periphery of said pneumatic tire a series of independent inner spoke shoes each provided with a corresponding spoke, an associated spider wheel having a series of spoke bearings through each of which slidably passes a corresponding spoke aforesaid, on the outer end of each spoke aforesaid an independent outer tire shoe connected to an outer road tire which with the outer tire shoes is movably fitted in an outer rim on said spider wheel, as described herein.

2. A pneumatic road wheel of the kind described herein comprising in combination with the road wheel hub, a spool hub, a rim surrounding said spool hub and on said rim a pneumatic tire, on the periphery of said pneumatic tire a series of independent inner spoke shoes each provided with a corresponding spoke, an associated spider wheel having a series of spoke bearings through each of which slidably passes a corresponding spoke aforesaid, on the outer end of each spoke aforesaid an independent outer tire shoe connected to an outer road tire which with the outer tire shoes is movably fitted in an outer rim on said spider wheel, over the inner spoke shoes aforesaid a bridge rim connected to said spoke bearings and at each side of said bridge rim side retaining plates connected to said spider wheel and to said bridge rim and to said spool hub, as described herein.

3. A pneumatic road wheel of the kind described herein comprising in combination with the road wheel hub, a spool hub, a rim surrounding said spool hub and on said rim a pneumatic tire, on the periphery of said pneumatic tire a series of independent inner spoke shoes each provided with a corresponding spoke, an associated spider wheel having a series of spoke bearings through each of which slidably passes a corresponding spoke aforesaid, on the outer end of each spoke aforesaid an independent outer tire shoe connected to an outer road tire which with the outer tire shoes is movably fitted in an outer rim on said spider wheel, over the inner spoke shoes aforesaid a bridge rim connected to said spoke bearings and at each side of said bridge rim side retaining plates connected to said spider wheel and to said bridge rim and to said spool hub, and at the periphery of and between and connected to said side retaining plates torc transmitting blocks in turn connected to said spider wheel, as described herein.

Signed by me this 13th day of September, 1920.

JOHN MARTIN.

Witnesses:
JOHN FENNESSY,
ANDREW J. FENNESSY.